US012695758B1

(12) United States Patent
Evenhaim et al.

(10) Patent No.: US 12,695,758 B1
(45) Date of Patent: Jul. 28, 2026

(54) DRIVING COMMUNICATIONS IN A SECURE STORAGE NETWORK BASED ON DATA ELEMENT TRANSITIONS

(71) Applicant: Veeva Systems Inc., Pleasanton, CA (US)

(72) Inventors: Asaf Evenhaim, New York, NY (US); Martin Reznick, West Hurley, NY (US); Karalyn Whetton, New York, NY (US)

(73) Assignee: Veeva Systems Inc., Pleasanton, CA (US)

( * ) Notice: Subject to any disclaimer, the term of this patent is extended or adjusted under 35 U.S.C. 154(b) by 148 days.

(21) Appl. No.: 18/819,085

(22) Filed: Aug. 29, 2024

(51) Int. Cl.
H04L 9/40 (2022.01)

(52) U.S. Cl.
CPC ............ H04L 63/102 (2013.01); H04L 63/20 (2013.01)

(58) Field of Classification Search
CPC .............................. H04L 63/102; H04L 63/20
See application file for complete search history.

(56) References Cited

U.S. PATENT DOCUMENTS

| | | | | |
|---|---|---|---|---|
| 9,960,913 | B2 * | 5/2018 | Pyka | H04L 63/068 |
| 11,012,326 | B1 * | 5/2021 | Campbell | H04L 63/20 |
| 11,082,487 | B1 * | 8/2021 | Jain | H04L 67/535 |
| 11,258,806 | B1 * | 2/2022 | Berninger | H04L 63/1441 |
| 11,297,085 | B2 * | 4/2022 | Albero | H04L 63/20 |
| 11,343,270 | B1 * | 5/2022 | Carter, Jr. | H04L 9/088 |

| | | | | |
|---|---|---|---|---|
| 11,544,381 | B2 * | 1/2023 | Lundeby | H04L 41/084 |
| 11,803,766 | B1 * | 10/2023 | Srinivasan | G06N 5/04 |
| 11,856,029 | B2 * | 12/2023 | Bastos | G06F 21/604 |
| 11,870,764 | B1 * | 1/2024 | Cheng | H04L 63/102 |
| 12,500,925 | B2 * | 12/2025 | Karimibiuki | G06F 21/566 |
| 12,505,146 | B1 * | 12/2025 | Henderson | G06F 16/355 |
| 2002/0161903 | A1 * | 10/2002 | Besaw | G06F 21/6218 |
| | | | | 709/224 |
| 2007/0143827 | A1 * | 6/2007 | Nicodemus | H04L 63/102 |
| | | | | 726/2 |
| 2010/0325159 | A1 * | 12/2010 | Wright | G06F 21/6218 |
| | | | | 726/21 |
| 2015/0006731 | A1 * | 1/2015 | Ren | H04L 47/805 |
| | | | | 709/226 |
| 2016/0012427 | A1 * | 1/2016 | Van Heerden | G06Q 20/382 |
| | | | | 705/44 |

(Continued)

*Primary Examiner* — Aravind K Moorthy

(74) *Attorney, Agent, or Firm* — Finnegan, Henderson, Farabow, Garrett & Dunner, LLP

(57) ABSTRACT

The disclosed method includes: initializing an optimization computing model; determining a training dataset; applying the training dataset to the optimization computing model to generate a trained optimization computing model; determining a second dataset; in response to applying the second dataset to the trained optimization computing model, initiating display of the optimization indicator on a first graphical display device; determining, based on the optimization indicator, a degree or rate of transition of at least one data element of the second dataset within a temporal window; determining, based on the degree or rate of transition, operational data; enabling modification of the operational data; and initiating transmission of the modified operational data to a second graphical display device via at least one of: a first application associated with a secure storage network, or a second application that is not associated with the secure storage network.

20 Claims, 6 Drawing Sheets

(56) References Cited

U.S. PATENT DOCUMENTS

| | | | |
|---|---|---|---|
| 2016/0211976 A1* | 7/2016 | Paris | H04L 63/06 |
| 2016/0344544 A1* | 11/2016 | Biesinger | H04L 63/20 |
| 2017/0195896 A1* | 7/2017 | Lee | H04W 8/245 |
| 2017/0289196 A1* | 10/2017 | Poliashenko | H04L 63/10 |
| 2017/0373933 A1* | 12/2017 | Subramanian | G06F 16/24578 |
| 2018/0307561 A1* | 10/2018 | Iljazi | G06F 11/0781 |
| 2019/0102706 A1* | 4/2019 | Frank | G06N 5/046 |
| 2019/0253441 A1* | 8/2019 | Horstmeyer | G06N 3/0464 |
| 2019/0273686 A1* | 9/2019 | Gammel | H04L 45/38 |
| 2019/0364131 A1* | 11/2019 | Rogynskyy | G06Q 10/107 |
| 2020/0007584 A1* | 1/2020 | Dixit | H04L 41/5019 |
| 2020/0034548 A1* | 1/2020 | Wu | H04L 9/50 |
| 2020/0058068 A1* | 2/2020 | Gandhi | G06Q 20/401 |
| 2020/0067906 A1* | 2/2020 | Florez | H04L 63/0815 |
| 2020/0104696 A1* | 4/2020 | Lewis | H04L 63/102 |
| 2020/0111194 A1* | 4/2020 | Wang | G06T 3/4076 |
| 2020/0267175 A1* | 8/2020 | Atighetchi | H04L 63/20 |
| 2020/0285952 A1* | 9/2020 | Liu | G06N 3/09 |
| 2020/0314127 A1* | 10/2020 | Wilson | H04L 43/16 |
| 2020/0314145 A1* | 10/2020 | Bolignano | H04L 63/20 |
| 2021/0058469 A1* | 2/2021 | Popelka | H04L 67/10 |
| 2021/0065118 A1* | 3/2021 | Notani | H04L 63/20 |
| 2021/0089918 A1* | 3/2021 | Rogers | G06N 3/098 |
| 2021/0092159 A1* | 3/2021 | Crabtree | G06F 16/951 |
| 2021/0203651 A1* | 7/2021 | Basson | G06F 21/556 |
| 2021/0392049 A1* | 12/2021 | Jeuk | H04L 41/0806 |
| 2022/0027519 A1* | 1/2022 | Kataria | H04L 63/10 |
| 2022/0029902 A1* | 1/2022 | Shemer | H04L 43/065 |
| 2022/0050697 A1* | 2/2022 | Oesch | G06N 7/01 |
| 2022/0086518 A1* | 3/2022 | Vikramaratne | H04L 63/102 |
| 2022/0094699 A1* | 3/2022 | Birur | H04L 63/108 |
| 2022/0109681 A1* | 4/2022 | Hamdi | H04L 43/0817 |
| 2022/0109687 A1* | 4/2022 | Sloane | H04L 43/04 |
| 2022/0131762 A1* | 4/2022 | Brubaker | H04L 41/145 |
| 2022/0156372 A1* | 5/2022 | Harang | H04L 63/145 |
| 2022/0188690 A1* | 6/2022 | Rawat | G06V 10/82 |
| 2022/0201045 A1* | 6/2022 | Brannon | G06N 20/00 |
| 2022/0337601 A1* | 10/2022 | Serna | H04L 63/1416 |
| 2022/0343095 A1* | 10/2022 | Naqvi | G06V 10/774 |
| 2022/0377085 A1* | 11/2022 | Singh | H04L 63/1416 |
| 2022/0385635 A1* | 12/2022 | Thimmisetty | H04L 63/0263 |
| 2022/0414536 A1* | 12/2022 | M L | H04L 9/008 |
| 2023/0042671 A1* | 2/2023 | Zaman | H04L 41/22 |
| 2023/0052533 A1* | 2/2023 | Furtak | G06N 3/09 |
| 2023/0179622 A1* | 6/2023 | Underwood | H04L 41/14 726/25 |
| 2023/0216866 A1* | 7/2023 | Monnig | H04L 63/20 |
| 2023/0216889 A1* | 7/2023 | Monge Nunez | G06N 3/08 726/1 |
| 2023/0231861 A1* | 7/2023 | Chen | H04L 63/102 726/26 |
| 2023/0247060 A1* | 8/2023 | Geusz | H04L 63/08 726/1 |
| 2023/0252040 A1* | 8/2023 | Maharaja | G06N 3/0464 707/803 |
| 2023/0275886 A1* | 8/2023 | Malik | G06F 21/604 726/17 |
| 2023/0281314 A1* | 9/2023 | Capellman | H04L 63/20 726/25 |
| 2023/0315722 A1* | 10/2023 | Saxe | G06F 16/3322 726/1 |
| 2023/0328070 A1* | 10/2023 | Zhang | G06N 20/10 |
| 2023/0370452 A1* | 11/2023 | Mannengal | H04L 41/12 |
| 2024/0007504 A1* | 1/2024 | Triplet | H04L 41/0869 |
| 2024/0056486 A1* | 2/2024 | Lowenhardt | H04L 41/16 |
| 2024/0152285 A1* | 5/2024 | Winokur | G06F 21/6218 |
| 2024/0163300 A1* | 5/2024 | Kumar | H04L 63/205 |
| 2024/0193487 A1* | 6/2024 | Farnan | G06N 3/08 |
| 2024/0195819 A1* | 6/2024 | Grajek | H04L 63/1416 |
| 2024/0202020 A1* | 6/2024 | McKee | G06F 9/45558 |
| 2024/0205237 A1* | 6/2024 | Tormasov | H04L 41/16 |
| 2024/0223539 A1* | 7/2024 | Bakshi | H04L 63/0421 |
| 2024/0236125 A1* | 7/2024 | Cozzetti | H04L 63/1425 |
| 2024/0256863 A1* | 8/2024 | Chen | G06N 3/04 |
| 2024/0281780 A1* | 8/2024 | Richter | G06N 20/00 |
| 2024/0291835 A1* | 8/2024 | Sethi | H04L 63/1425 |
| 2024/0348629 A1* | 10/2024 | Berninger | G06N 20/00 |
| 2024/0348663 A1* | 10/2024 | Crabtree | H04L 63/104 |
| 2024/0380766 A1* | 11/2024 | Shachar | H04L 63/1425 |
| 2025/0016569 A1* | 1/2025 | Balmakhtar | H04W 12/08 |
| 2025/0030701 A1* | 1/2025 | Kurian | H04L 63/12 |
| 2025/0156748 A1* | 5/2025 | Rajagopalan | H04L 63/20 |
| 2025/0232351 A1* | 7/2025 | Tao | H04L 63/102 |
| 2025/0247394 A1* | 7/2025 | Pande | G06Q 10/0635 |
| 2025/0280039 A1* | 9/2025 | Gangwani | H04L 63/1433 |
| 2025/0294013 A1* | 9/2025 | Singh | H04L 63/20 |
| 2025/0350602 A1* | 11/2025 | Black | H04L 63/20 |
| 2025/0365316 A1* | 11/2025 | Arjunan | H04L 63/083 |
| 2025/0373611 A1* | 12/2025 | Ferenczi | H04L 63/10 |
| 2025/0373615 A1* | 12/2025 | Harari | G06F 21/604 |
| 2025/0392598 A1* | 12/2025 | Kumar | H04L 63/102 |
| 2026/0039697 A1* | 2/2026 | Ezrielev | H04L 63/20 |
| 2026/0039698 A1* | 2/2026 | Garg | H04L 63/20 |
| 2026/0058993 A1* | 2/2026 | Bleeker | H04L 63/20 |

* cited by examiner

INITIALIZING AN OPTIMIZATION COMPUTING MODEL FOR THE SECURE STORAGE NETWORK, THE OPTIMIZATION COMPUTING MODEL BEING PARAMETERIZED BY: A FIRST PARAMETER PROBABILISTICALLY CHARACTERIZING PROPENSITY DATA OF A COLLECTION OF DIGITAL PROFILES ASSOCIATED WITH THE SECURE STORAGE NETWORK, AND A SECOND PARAMETER ASSOCIATED WITH A TEMPORAL WINDOW WITHIN WHICH AT LEAST SOME DATA ELEMENTS COMPRISED IN THE COLLECTION OF DIGITAL PROFILES TRANSITION FROM A FIRST DATA STATE TO A SECOND DATA STATE
402

DETERMINING A FIRST DATASET ASSOCIATED WITH THE SECURE STORAGE NETWORK, THE FIRST DATASET COMPRISING A FIRST SET OF DATA ELEMENTS, ASSOCIATED WITH THE COLLECTION OF DIGITAL PROFILES, THAT DO NOT TRANSITION FROM THE FIRST DATA STATE TO THE SECOND DATA STATE
404

FORMATTING THE FIRST DATASET, THEREBY RESULTING IN A TRAINING DATASET FOR APPLICATION TO THE OPTIMIZATION COMPUTING MODEL
406

APPLYING THE TRAINING DATASET TO THE OPTIMIZATION COMPUTING MODEL, THEREBY RESULTING IN A TRAINED OPTIMIZATION COMPUTING MODEL
408

DETERMINING A SECOND DATASET ASSOCIATED WITH THE SECURE STORAGE NETWORK, THE SECOND DATASET COMPRISING A SECOND SET OF DATA ELEMENTS, ASSOCIATED WITH THE COLLECTION OF DIGITAL PROFILES, THAT TRANSITION FROM THE FIRST DATA STATE TO THE SECOND DATA STATE WITHIN THE TEMPORAL WINDOW
410

APPLYING THE SECOND DATASET TO THE TRAINED OPTIMIZATION COMPUTING MODEL
412

IN RESPONSE TO THE APPLYING THE SECOND DATASET TO THE TRAINED OPTIMIZATION COMPUTING MODEL, INITIATING, USING THE ONE OR MORE COMPUTING DEVICE PROCESSORS, DISPLAY OF THE OPTIMIZATION INDICATOR ON A FIRST GRAPHICAL DISPLAY DEVICE VIA A FIRST APPLICATION ASSOCIATED WITH THE SECURE STORAGE NETWORK
414

DETERMINING, BASED ON THE OPTIMIZATION INDICATOR, A DEGREE OR RATE OF TRANSITION OF AT LEAST ONE DATA ELEMENT OF THE SECOND DATASET FROM THE FIRST DATA STATE TO THE SECOND DATA STATE WITHIN THE TEMPORAL WINDOW
416

DETERMINING, BASED ON THE DEGREE OR RATE OF TRANSITION OF AT LEAST ONE DATA ELEMENT OF THE SECOND DATASET FROM THE FIRST DATA STATE TO THE SECOND DATA STATE WITHIN THE TEMPORAL WINDOW, OPERATIONAL DATA ASSOCIATED WITH ONE OR MORE OF THE COLLECTION OF DIGITAL PROFILES
418

ENABLING MODIFICATION OF THE OPERATIONAL DATA, THEREBY RESULTING IN MODIFIED OPERATIONAL DATA TRANSMITTING THE MODIFIED OPERATIONAL DATA TO A COMPUTING DEVICE ASSOCIATED WITH THE ONE OR MORE COLLECTION OF DIGITAL PROFILES
420

INITIATING TRANSMISSION OF THE MODIFIED OPERATIONAL DATA TO A SECOND GRAPHICAL DISPLAY DEVICE VIA AT LEAST ONE OF: A SECOND APPLICATION ASSOCIATED WITH THE SECURE STORAGE NETWORK, OR A THIRD APPLICATION THAT IS NOT ASSOCIATED WITH THE SECURE STORAGE NETWORK
422

FIG. 4

DRIVING COMMUNICATIONS IN A SECURE STORAGE NETWORK BASED ON DATA ELEMENT TRANSITIONS

TECHNICAL FIELD

This disclosure is directed to leveraging data transitions in a secure storage network to drive data communications.

BACKGROUND

In complex secure storage networks having a plurality of digital profiles, there is a need to analyze or detect or apply data element transitions to inform or drive optimal data communications.

SUMMARY

This disclosure is directed to methods, systems, and computer program products for generating an optimization indicator based on data state transitions of data elements associated with one or more digital profiles in a secure storage network. According to an embodiment, a method for generating an optimization indicator based on data state transitions of data elements associated with one or more digital profiles in a secure storage network comprises: initializing an optimization computing model for the secure storage network, the optimization computing model being parameterized by: a first parameter probabilistically characterizing propensity data of a collection of digital profiles associated with the secure storage network, and a second parameter associated with a temporal window within which at least some data elements comprised in the collection of digital profiles transition from a first data state to a second data state; determining, using the one or more computing device processors, a first dataset associated with the secure storage network, the first dataset comprising a first set of data elements, associated with the collection of digital profiles, that do not transition from the first data state to the second data state; formatting, using the one or more computing device processors, the first dataset, thereby resulting in a training dataset for application to the optimization computing model; applying, using the one or more computing device processors, the training dataset to the optimization computing model, thereby resulting in a trained optimization computing model; determining, using the one or more computing device processors, a second dataset associated with the secure storage network, the second dataset comprising a second set of data elements, associated with the collection of digital profiles, that transition from the first data state to the second data state within the temporal window; applying, using the one or more computing device processors, the second dataset to the trained optimization computing model; in response to the applying the second dataset to the trained optimization computing model, initiating, using the one or more computing device processors, display of the optimization indicator on a first graphical display device via a first application associated with the secure storage network; determining, using the one or more computing device processors, based on the optimization indicator, a degree or rate of transition of at least one data element of the second dataset from the first data state to the second data state within the temporal window; determining, using the one or more computing device processors, based on the degree or rate of transition of at least one data element of the second dataset from the first data state to the second data state within the temporal window, operational data associated with one or more of the collection of digital profiles; enabling modification of, using the one or more computing device processors, the operational data, thereby resulting in modified operational data; transmitting the modified operational data to a computing device associated with the one or more collection of digital profiles; and initiating, using the one or more computing device processors, transmission of the modified operational data to a second graphical display device via at least one of: a second application associated with the secure storage network, or a third application that is not associated with the secure storage network.

In another embodiment, a system and a computer program product can include or execute the method described above. These and other implementations may each optionally include one or more of the following features.

The above method may further comprise executing, using the one or more computing device processors, a computing simulation that stabilizes the optimization computing model to enable applying the second dataset to the trained optimization computing model.

In addition, the optimization indicator may be used to execute a computing operation to predict a rate of conversion of one or more digital profiles comprised in the collection of digital profiles from the first data state to the second data state.

In some embodiments, the optimization indicator comprises binary information associated with data elements of at least one digital profile comprised in the collection of digital profiles transitioning from the first data state to a second data state based on a configurable data object associated with the secure storage network. In some cases, the modified operational data comprises content data associated with the configurable data object. The content data may comprise data transmissions occurring after determining the optimization indicator.

It is appreciated that the optimization computing model may be updated based on at least the optimization indicator and data element transitions of the collection of digital profiles prior to, during, or after, transmitting the content data associated with the configurable data object. It is further appreciated that the optimization computing model comprises a logistic regression computing model.

According to some embodiments, the first parameter comprises quantitative data based on a scale. In some cases, the temporal window associated with the second parameter is at least three months.

In some embodiments, the first dataset or the second dataset comprises a plurality of properties associated with the collection of digital profiles. These properties, for example, can include: demographic data associated with the collection of digital profiles; biological indication data associated with the collection of digital profiles; one or more data protocols associated with managing the biological indication data associated with the collection of digital profiles; response data associated with applying the one or more data protocols to the biological indication data; or data element transition data associated with the collection of digital profiles.

It is appreciated that the optimization indicator comprises at least textual data and/or image data.

BRIEF DESCRIPTION OF THE DRAWINGS

The disclosure is illustrated by way of example, and not by way of limitation in the figures of the accompanying drawings in which like reference numerals are used to refer to similar elements. It is appreciated that various features may not be drawn to scale and the dimensions of various features may be arbitrarily increased or reduced for clarity of discussion. Further, some components may be omitted in certain figures for clarity of discussion.

FIG. 4 shows an exemplary workflow for generating an optimization indicator based on data state transitions of data elements associated with one or more digital profiles in a secure storage network.

Although similar reference numbers for the foregoing drawings may be used to refer to similar elements for convenience, it is appreciated that each of the various exemplary embodiments may be considered to be distinct variations. As used in this disclosure, the terms "embodiment," "example embodiment," "exemplary embodiment," "implementation," and the like do not necessarily refer to a single embodiment, although it may, and various example embodiments may be readily combined and interchanged, without departing from the scope or spirit of the present disclosure. Furthermore, the terminology used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Reference will now be made to various embodiments, examples of which are illustrated in the accompanying drawings and figures. In the following detailed description, numerous specific details are set forth in order to provide a thorough understanding of this disclosure. However, it will be apparent to one of ordinary skill in the art that the disclosure may be practiced without these specific details. In some instances, well-known methods, processes, components, systems, and networks have not been described in detail so as not to unnecessarily obscure aspects of the disclosed embodiments.

Network Environment

Figure 1A:
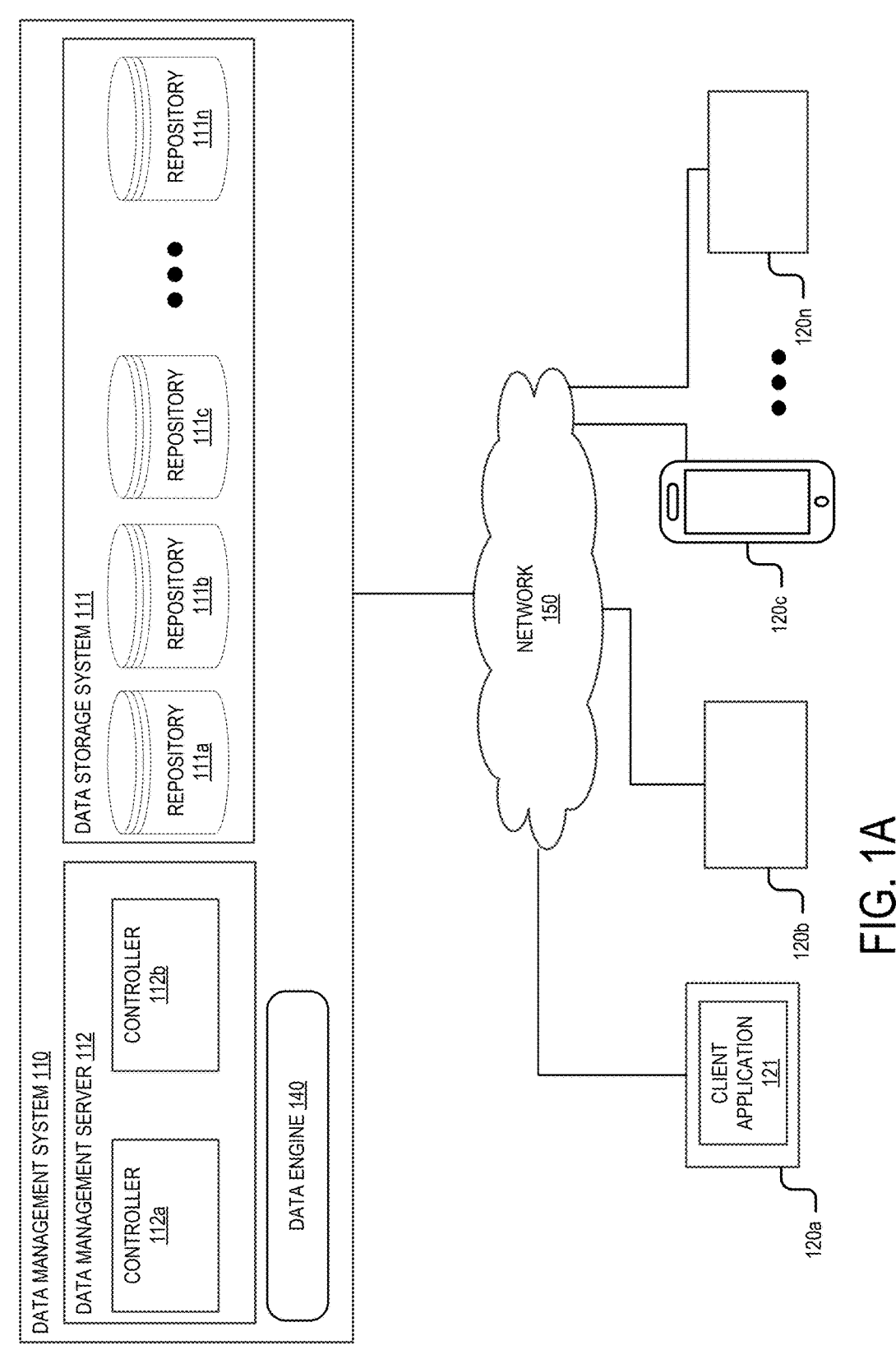
FIG. 1A illustrates an exemplary secure storage network within which the present technology may be implemented, according to some embodiments of this disclosure.

FIG. 1A illustrates an exemplary secure storage network 100 within which the present technology may be implemented. As shown, the secure storage network 100 may include a data management system 110 (also referred to as a secure storage system 110 elsewhere herein), and a plurality of user computing devices 120a, 120b, . . . 120n coupled to each other via a network 150.

The data management system 110 may include a data storage system 111 and a data management server 112. The data storage system 111 may have one or more secure repositories 111a, 111b, 111c, . . . 111n. Each of the one or more secure repositories 111a, 111b, 111c, . . . 111n may comprise two or more secure storage structures configured to store, at least index data and/or file data, and/or record data as the case may require. According to one embodiment, the index data and/or file data, and/or record data may be associated with medical facility, a research facility, a governmental agency, an educational institution, etc. In some cases, the data storage system 111 comprises secure data structures and/or computing storage structures that securely store data indices, files associated with said data indices, and/or records associated with said data indices.

The network 150 may include one or more types of communication networks such as a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a, . . . 120n may be any machine or system that is used by a user to access the data management system 110 via the network 150, and may comprise computing devices including laptop computers, desktop computers, mobile phones, smart phones, tablet computers, and netbooks. A client application 121 (e.g., a secure interface) associated with the data management system 110 may be run from a user computing device (e.g., 120a) to securely access data in the data management system 110 via the network 150.

The data storage system 111 may store data that client applications (e.g., client application 121) in user computing devices 120a . . . 120n may access. Furthermore, the data storage system 111 may comprise any commercially available storage devices.

According to one embodiment, each content repository (e.g., 111a, 111b, 111c, . . . or 111n) may store one or more data categories such that one or more users may be provided access to the one or more data categories based on context data associated with the one or more users and/or context data associated with the one or more data categories.

It is appreciated that the disclosed content repositories 111a, 111b, 111c, . . . 111n may comprise separate logic sections in the same storage device. According to one embodiment, content data stored in the content repositories 111a, 111b, 111c, . . . 111n may comprise controlled content stored in specialized databases including at least one source of truth database within said repositories such that specific users and/or specific computing devices may be provided credential access to said repositories based on one or more profiles of the specific users and/or specific devices previously stored or otherwise associated with the data management system 110.

According to one embodiment, each of the content repositories 111a, 111b, 111c, . . . 111n can be implemented as one or more computer-readable or machine-readable storage media that are non-transitory. In some embodiments, the content repositories 111a, 111b, 111c, . . . 111n may be distributed within and/or across multiple internal and/or external enclosures of a computing system and/or additional computing systems. Furthermore, each of the content repositories 111a, 111b, 111c, . . . 111n may comprise one or more similar or dissimilar forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks; optical media such as compact disks (CDs) or digital video disks (DVDs), BluRays or other types of optical media; or other types of storage devices.

The data management server 112 may comprise a remote computer system accessible over a remote or local network, such as the network 150. The data management server 112 may store a data management controller 112a and a data collection controller 112b for controlling management and collection of the data. The data management server 112 could be any commercially available computing devices. Although only one server is shown, it is appreciated that the data management system 110 may have a plurality of servers such that the controllers 112a and 112b may be in separate servers. A client application (e.g., client application 121) may be active on one or more user computing devices 120a, . . . , 120n. The corresponding server application may be active on the data management server 112. The client application and the corresponding server application may communicate with each other over the network 150 and thereby provide distributed functionality and allow multiple client applications to take advantage of the information-gathering capabilities of the data management system 110.

Figure 2:
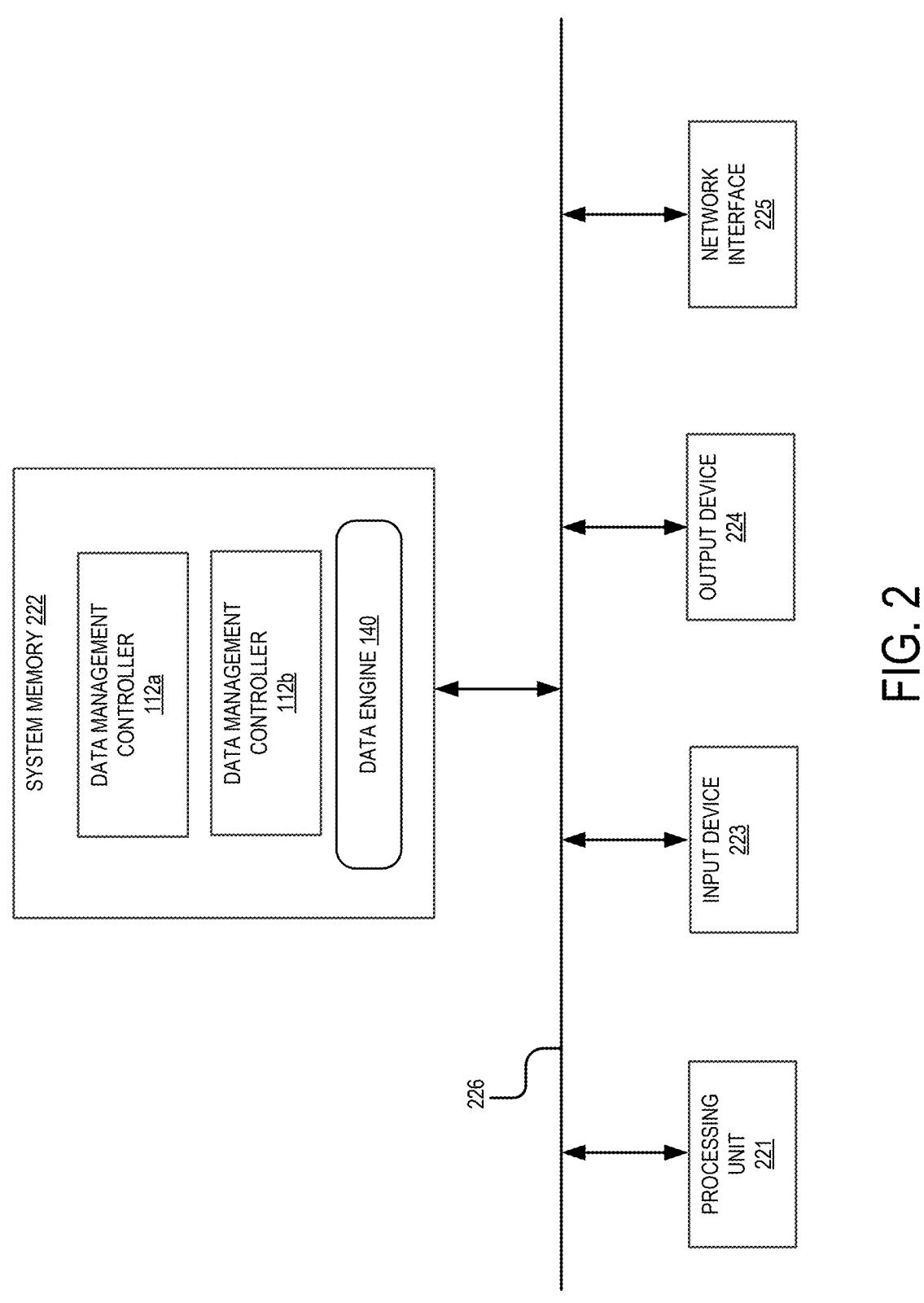
FIG. 2 illustrates an example high level block diagram of the data management system of FIG. 1A, according to some embodiments of this disclosure.

The data engine 140 shown within the data management system 110 may include instructions stored in a system memory (e.g., memory 222 of FIG. 2) that are executed by one or more computing device processors (e.g., processing unit 221 of FIG. 2). The instructions may include various operations or processes discussed below in association with, for example, one or more task protocols, and/or one or more data routing computing operations, and/or one or more data correlation or data relation computing operations.

In one embodiment, the secure storage network 100 may be used for collecting and managing data (e.g., digital profile data with attendant data elements, index data, file data, record data, file or record data associated with a trial, file or record data associated with a research, medical file or record data, etc.). For example, a first repository (e.g., repository 111a) of the secure storage network 100 may store electronic records or electronic files or index data as the case may require. In some cases, the electronic records comprise electronic data capture (EDC) data and/or trial source data (e.g., associated with a subject), and/or medical inquiry data, and/or quality control data, and/or safety data, etc. It is appreciated that a trial as described in this disclosure may refer to a clinical trial.

The data management system 110 may have: one or more interfaces for receiving the plurality of data described herein; database or query mechanisms for operating on the plurality of data; and one or more reporting tools for analysis of the plurality of data.

Furthermore, each of the content repositories 111a, 111b, 111c, . . . or 111n may be used by a plurality of sites (e.g., a hospital site, a school site, a research site, a pharmaceutical company site, etc.) to store the plurality of data provided in this disclosure. In one embodiment, the plurality of data comprises source data (e.g., vital statistics data such as blood pressure values, research results values, chemical analysis values, biographic data, bibliographic data, demographic data, test data, etc.) which may be converted to EDC data automatically, and then stored in one or more of the content repositories 111a, 111b, 111c, . . . or 111n. It is appreciated that the EDC data stored in the various content repositories 111a, 111b, 111c, . . . or 111n may be synchronized to ensure that data inconsistencies do not creep into any of the content repositories 111a, 111b, 111c, . . . or 111n. It is further appreciated that each of the content repositories 111a, 111b, 111c, . . . or 111n may have two or more data storage structures.

In one embodiment, the data management system 110 may comprise a multi-tenant system where various elements of hardware and software are shared by one or more users. For instance, the data management server 110 may simultaneously and securely process requests from a plurality of users, and the data storage system 111 may securely store controlled or secure content for the plurality of users.

In one embodiment, the data management system 110 may run on a cloud computing platform. Users of said cloud computing platform can access the controlled content comprised in the cloud computing platform independently by using, for example, a virtual machine image, or acquiring access to a service maintained by a cloud database provider associated with the secure storage network 100. In one embodiment, the data management system 110 may be provided as Software as a Service ("SaaS") to allow users to access the data management system 110 with, for example, a thin client.

Figure 1B:
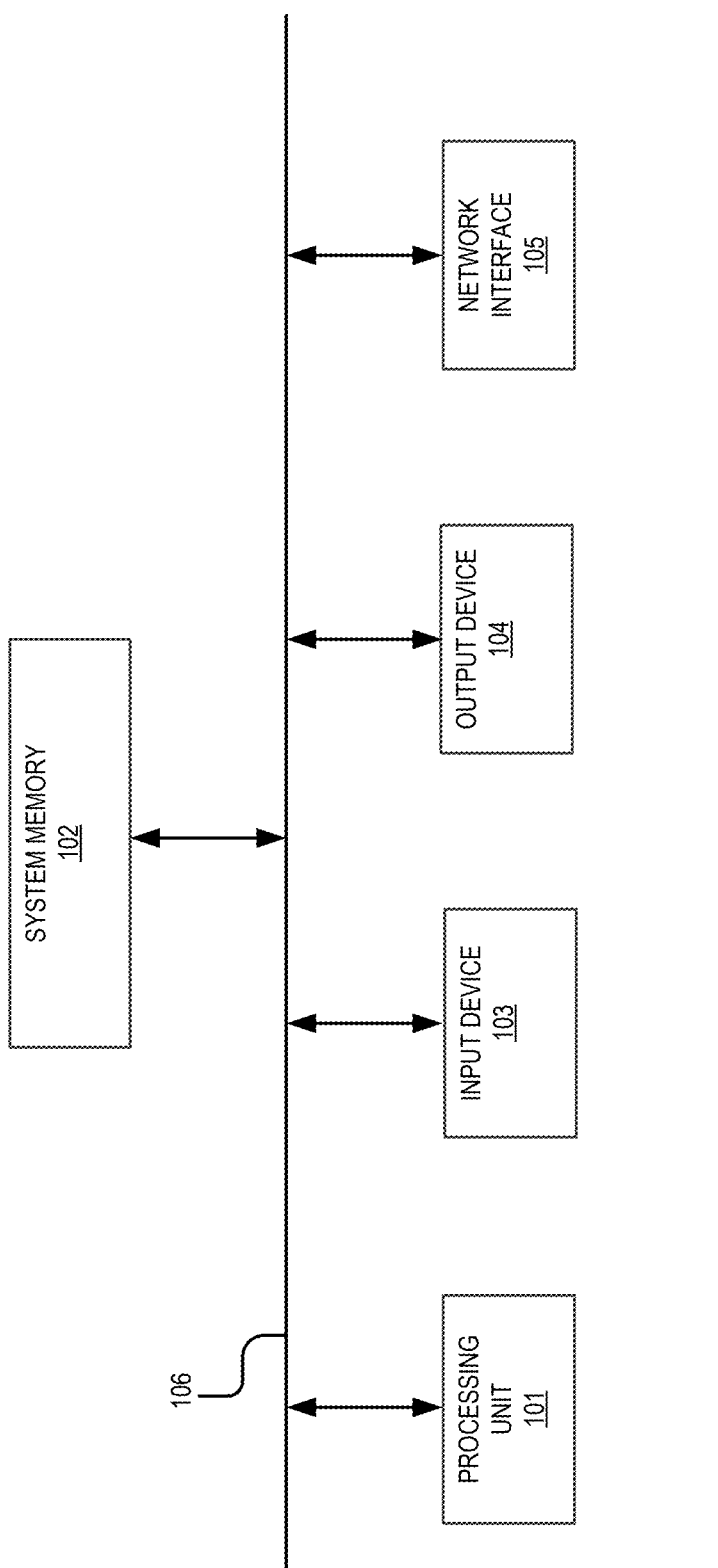
FIG. 1B illustrates an example block diagram of a computing device within which one or more systems or devices of FIG. 1A can be implemented, according to some embodiments of this disclosure.

FIG. 1B illustrates an example block diagram of a computing device which can be used as the computing devices 120a, . . . , 120n, and the data management system 110 of FIG. 1A. The illustrated computing device is only one example of a suitable computing environment and is not intended to suggest any limitation as to scope of use or functionality. The computing device of FIG. 1B may include a processing unit 101, a system memory 102, an input device 103, an output device 104, a network interface 105, and a system bus 106 that couples these components to each other.

The processing unit 101 may be configured to execute computer instructions or computing operations that are stored in a computer-readable medium, for example, the system memory 102. The processing unit 101 may comprise a central processing unit (CPU).

The system memory 102 can include a variety of computer readable media which may be any available media accessible by the processing unit 101. For instance, the system memory 102 may include computer storage media in the form of volatile and/or non-volatile memory such as read only memory (ROM) and/or random-access memory (RAM). By way of example, but not limitation, the system memory 102 may store instructions and data including an operating system, program sub-systems, various application programs, and program data.

A user can enter computing commands and/or information to the computing device of FIG. 1B through the input device 103. The input device 103 may comprise a keyboard, a touchscreen input device, a touch pad, a mouse, a microphone, and/or an electronic pen and/or some other input computing device.

The computing device of FIG. 1B may provide output data via the output device 104 which may comprise a monitor, a display device (e.g., a display screen of a tablet, cell phone, etc.), a speaker, a printer, or some other output computing device.

The computing device of FIG. 1B, through the network interface 105, may operate in a networked or distributed environment using logical connections to one or more other computing devices, which may be a personal computer (PC), a server, a router, a network PC, a peer device, a smart phone, or any other media consumption or transmission computing device, and may include any or all of the elements described above. The logical connections may include a network (e.g., the network 150) and/or buses. The network interface 105 may be configured to allow the computing device of FIG. 1B to transmit and receive data in a network, for example, the network 150. The network interface 105 may include one or more network interface cards (NICs). It is appreciated that the computing device of FIG. 1B could comprise a stationary computing device or a mobile computing device.

FIG. 2 illustrates an example high level block diagram of the data management server 112 according to one embodiment of the present disclosure. The data management server 112 may be implemented by the computing device such as the computing device of FIG. 1B, and may have a processing unit 221, a system memory 222, an input device 223, an output device 224, and a network interface 225, coupled to each other via a system bus 226.

The system memory 222 may comprise data management controllers 112a and 112b. In one embodiment, the data management controllers 112a and 112b may be comprised in one or more applications including a web application or a Java application. In addition, the data management controllers 112a and 112b may be configured to receive and/or store the plurality of data disclosed.

The system memory 222 may also include a data engine 140 or one or more data engines 140 stored in the memory device 22 and which cause a computer processor to execute the various processing stages of FIG. 4 as further discussed below. For example, the flowchart of FIG. 4 may be executed using the data engine 140 or a data processing module (e.g., computing module) stored in memory 222 such that the data engine 140 includes instructions that are executed by one or more processing units 221 to implement at least the flowchart of FIG. 4.

Figure 3A:
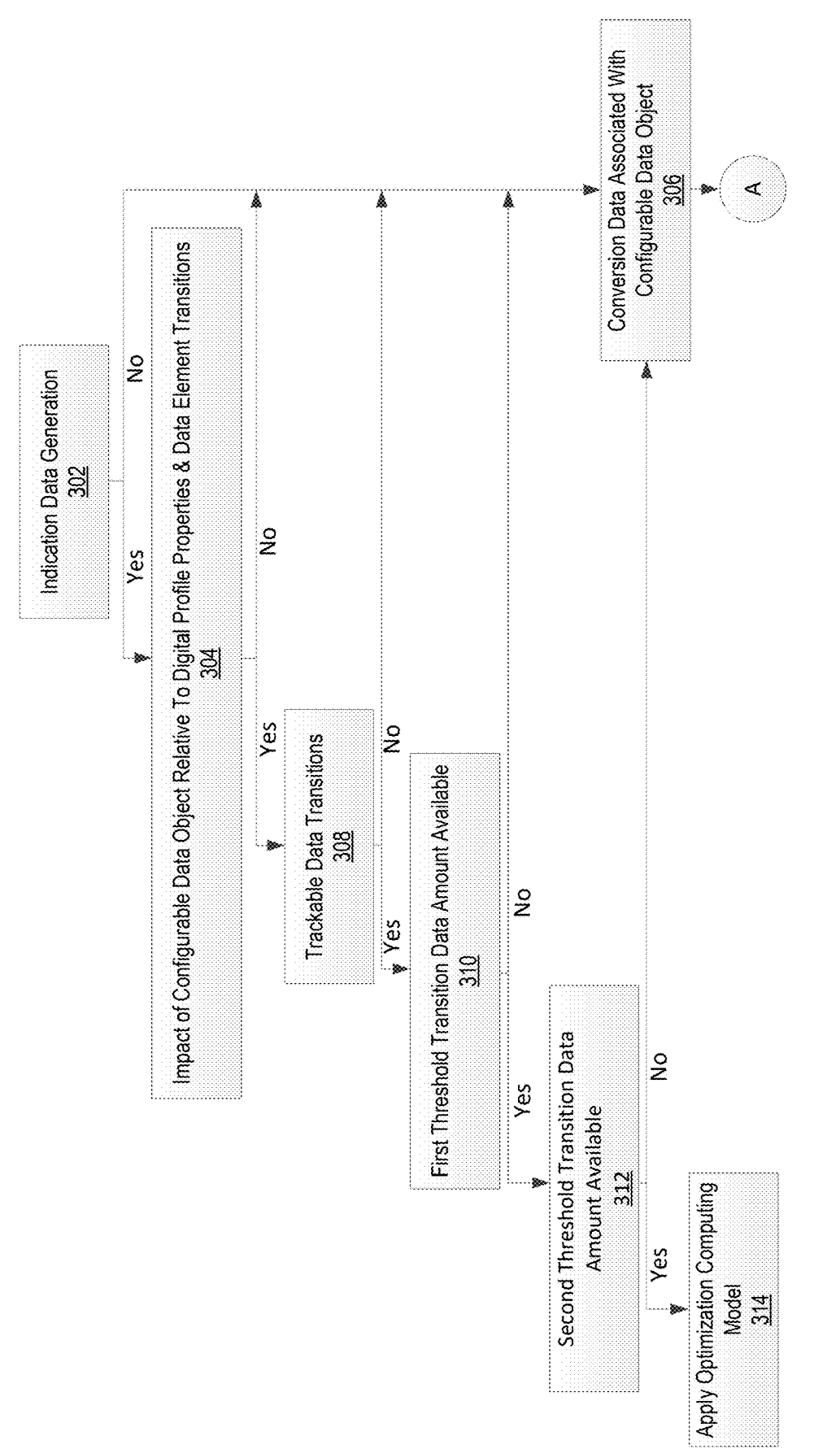
FIGS. 3A and 3B show exemplary workflows for applying one or more datasets to an optimization model of the disclosed secure storage network.
Figure 3B:
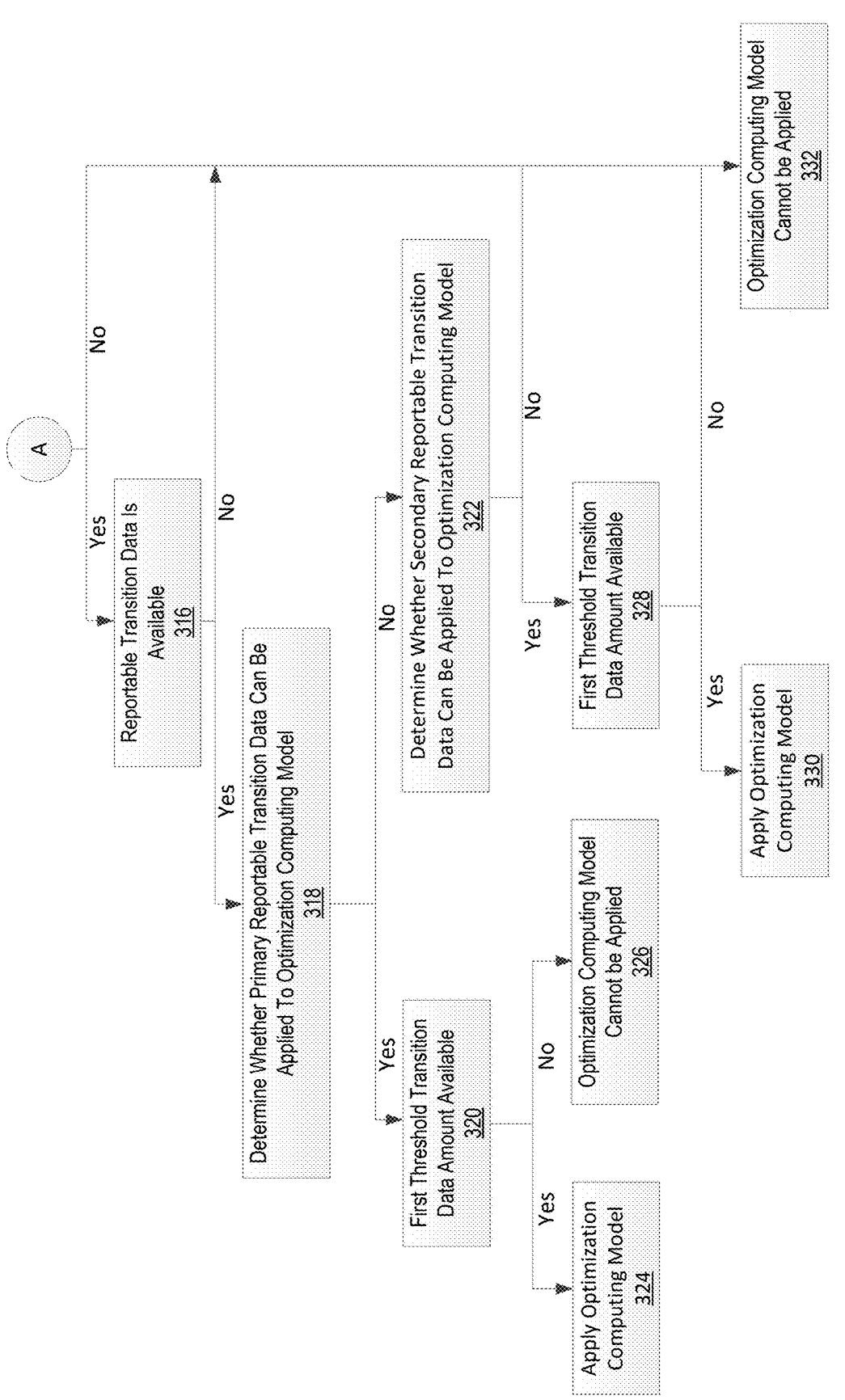

FIGS. 3A and 3B show exemplary workflows for applying one or more datasets to an optimization model of the disclosed secure storage network. It is appreciated that one or more data engines may execute the various processing stages of FIGS. 3A and 3B.

At block 302, indication data may be determined or generated for one or more configurable data objects. According to one embodiment, the indication data may be associated with one or more properties associated with one or more digital profiles.

If the indication data is determined, an impact of the configurable data object relative to the indication data and/or relative to properties associated with one or more digital profiles and/or relative to data element transitions associated with the one or more digital profiles is determined at block 304. If the determination at block 304 is in the negative, the workflow proceeds to block 306 where conversion data is generated for the configurable data object. Otherwise, once the determination at block 304 is in the affirmative, the workflow proceeds to block 308 where a determination is made on whether the data transitions associated with the one or more digital profiles relative to the configurable data object can be tracked.

At block 310, first threshold transition data amount is determined. This could comprise a first number of data transitions greater than or equal to 500 data transitions. Following this a second threshold transition data amount data is also determined at block 312. The second threshold transition data may indicate a quantitative parameter indicating an impact of the data transitions based on the configurable data object. If the second threshold transition data is greater than or equal to, for example, 10, or 20, or 30, or 40, the workflow proceeds to applying training data and/or testing data to the optimization computing model at block 314 and thereby generate the optimization indicator.

Turning to block 316, it is determined whether transition data associated with one or more data elements of the one or more digital profiles are reportable. If they are, the workflow proceeds to block 318 where it is determined whether the reportable data can be applied to the optimization computing model. At block 320, the first threshold amount may be determined, and if available, the optimization computing model can be applied to determine the optimization indicator as shown at block 324. Otherwise, a determination is made, at block 326, that the optimization computing model cannot be applied.

If the determination is made at block 318 that transition data (e.g., primary transition data associated with a first aggregate of data element transitions of one or more digital profiles) is not reportable, the workflow branches to block 322 where secondary reportable transition data (e.g., individual data element transitions associated with the one or more digital profiles relative to a configurable data object) is determined. If the secondary reportable transition data is available, the first threshold transition data amount is determined at block 328 following which the optimization computing model is used, at block 330 to generate the optimization indicator. Otherwise, the workflow proceeds to block 322 where a determination is made that the Optimization computing model cannot be leveraged to generate the optimization indicator. Workflows or flowcharts associated with leveraging the optimization computing model are disclosed below.

EXEMPLARY EMBODIMENTS

Disclosed are methodologies for generating an optimization indicator to drive data communications associated with a plurality of digital profiles. According to one embodiment, the optimization indicator may be generated using one or more artificial intelligence or machine learning models. In particular, the optimization indicator may provide, or otherwise inform a communication strategy within or outside the disclosed secure storage network. According to one embodiment, the optimization indicator provides data insights regarding a rate of transition of one or more data elements of the plurality of digital profiles within a temporal window of at least a day, or at least a week, or at least three weeks, or at least a month, or at least three months, or at least a year.

In some embodiments, an optimization computing model may be generated and parameterized or otherwise configured to generate the optimization indicator. In particular, the optimization computing model may be based on a logistic regression function or logic, a Scikit-Learn regression function or logic, a propensity score function or logic, and exposure data associated with the plurality of digital profiles. According to one embodiment, the exposure data comprises a timeframe following which one or more data communications (e.g., operational data communications) are transmitted in association with the plurality of digital profiles.

In some cases, a training dataset for the optimization computing model may be generated based on a timeframe associated with previous operational data communications spread across the plurality of digital profiles. The timeframe, for example, may be associated with a remote procedure call (RPC) based on a plurality of properties associated with one or more digital profiles. In some cases, the timeframe may be based on durations when past transmissions of operational data within or external relative to the secure storage network have occurred. Furthermore, the training dataset may be cleaned or otherwise filtered to remove data anomalies, data value discrepancies (e.g., removing missing values), and inaccurate datapoints (e.g., irrelevant datapoints). According to one embodiment, the training dataset is comprised in a holistic dataset associated with the secure storage network such that the holistic dataset also includes a validation dataset for validating data predictions or data outputs associated with the optimization computing model, and test datasets which have data element transitions that are verified using the optimization computing model.

Exemplary Detailed Flowchart

FIG. 4 shows an exemplary workflow for generating an optimization indicator based on data state transitions of data elements associated with one or more digital profiles in a secure storage network. It is appreciated that one or more data engines stored in a memory device may cause a computer processor to execute the various processing stages of the workflow of FIG. 4. For example, the disclosed techniques may be implemented as one or more data engines comprised in a secure storage network that is optimized to store and/or process data associated with a plurality of profiles or computing models.

At block 402, the one or more data engines may initialize an optimization computing model for the secure storage network, the optimization computing model being parameterized by: a first parameter probabilistically characterizing propensity data of a collection of digital profiles associated with the secure storage network; and a second parameter associated with a temporal window within which at least some data elements comprised in the collection of digital profiles transition from a first data state to a second data state. According to one embodiment, the propensity data contextualizes a likelihood of transitioning data elements associated with the collection of digital profiles based on data parameters of one or more configurable data objects. The data parameters of the one or more configurable data objects may be dynamically linked to one or more properties of the collection of digital profiles. These properties may be regarded as data correlates connecting one or more digital profiles comprised in the collection of digital profiles to the one or more configurable data objects. Moreover, the one or more configurable data objects may include a parameterized computing model of a system or a product or a service, adapted to drive computing or non-computing operations associated with the collection of digital profiles within the secure storage network.

Turning to block 404, the one or more data engines determine a first dataset associated with the secure storage network. The first dataset, for example, can comprise a first set of data elements associated with the collection of digital profiles that do not transition from the first data state to the second data state. This is beneficial as such an approach leverages a data agnostic process that does not rely on prior data transitions to determine or otherwise train the optimization model provided in this disclosure. According to some embodiments, the first dataset comprises not only data elements that have not undergone state transitions but can include data elements that have undergone state transitions. According to one element, state transitions of one or more data elements of a digital profile comprises: a qualitative or quantitative change in value of data elements associated with one or more digital profiles; a qualitative or quantitative change in status data associated with one or more digital profiles; recorded operation data or activity data associated with one or more digital profile relative to a configurable data object; and indication data (e.g., health or non-health) changes associated with one or more digital profiles.

Turning back to FIG. 4, the one or more data engines may format, at block 406, the first dataset, thereby resulting in a training dataset for application to the optimization computing model. According to one embodiment, formatting the first dataset comprises computationally filtering or cleaning the first dataset to remove: data elements having anomalies relative to the collection of digital profiles; data elements with missing values relative to the first dataset; data elements with irrelevant or irregular data points relative to the digital profiles; segmentation of data elements of the first dataset relative to data correlates derived from property data of the collection of digital profiles; etc. According to one embodiment, the data correlates indicate data connections or data links associated with one or more properties of the collection of digital profiles.

At block 408, the one or more data engines may apply the training dataset to the optimization computing model, thereby resulting in a trained optimization computing model. According to one embodiment, the trained optimization model may be subjected to one or more computing simulations to stabilize or otherwise render the optimization model to converge or arrive at a steady state to enable its usage for prediction computing operations as further discussed below.

Turning to block 410, the one or more data engines may be used to determine a second dataset associated with the secure storage network. According to one embodiment, the second dataset comprises a second set of data elements associated with the collection of digital profiles that transition from the first data state to the second data state within the temporal window. Following this the one or more computing device processors may apply, the second dataset to the trained optimization computing model at block 412. In response to applying the second dataset to the trained optimization computing model, the one or more data engines may initiate display of the optimization indicator on a first graphical display device via a first application associated with the secure storage network as indicated at block 414.

Furthermore, the one or more data engines may also determine, at block 416, based on the optimization indicator, a degree or rate of transition of at least one data element of the second dataset from the first data state to the second data state within the temporal window. At block 418, the one or more data engines may determine, based on the degree or rate of transition of at least one data element of the second dataset from the first data state to the second data state within the temporal window, operational data associated with one or more of the collection of digital profiles.

Following this the one or more data engines may also enable modification of, at block 420, the operational data, thereby resulting in modified operational data. According to one embodiment, the operational data or modified operational data may comprise one or more indicators that drive alterations and/or computing activities, and/or non-computing activities associated with the collection of digital profiles. In some cases, the operational data or modified operational data comprises control data that transforms data elements of the collection of digital profiles. In other embodiments, the operational data or modified operational data comprises logic or a protocol that specifies a trajectory of data transitions of data elements associated with the collection of digital profiles based on a configurable data object. In exemplary embodiments, the operational data is associated with a configurable data object such that the operational data or modified operational data specifies the data relationships, and/or data links, and/or data connections between the configurable data object and one or more of the collection of digital profiles. In some cases, the operational data or modified operational data may be adapted to drive or otherwise specify how data elements of the collection of digital profiles are updated.

Turning to block 420, the one or more data engines may transmit the modified operational data to a computing device associated with the one or more collection of digital profiles. Moreover, the one or more data engines may further initiate transmission of the modified operational data to a second graphical display device via at least one of: a second application associated with the secure storage network; or a third application that is not associated with the secure storage network.

In another embodiment, a system and a computer program product can include or execute the method described above. These and other implementations may each optionally include one or more of the following features.

The above method may further comprise executing, using the one or more computing device processors, a computing simulation that stabilizes the optimization computing model to enable applying the second dataset to the trained optimization computing model.

In addition, the optimization indicator may be used to execute a computing operation to predict a rate of conversion of one or more digital profiles comprised in the collection of digital profiles from the first data state to the second data state.

In some embodiments, the optimization indicator comprises binary information associated with data elements of at least one digital profile comprised in the collection of digital profiles transitioning from the first data state to a second data state based on a configurable data object associated with the secure storage network. In some cases, the modified operational data comprises content data associated with the configurable data object. The content data may comprise data transmissions occurring after determining the optimization indicator.

It is appreciated that the optimization computing model may be updated based on at least the optimization indicator and data element transitions of the collection of digital profiles prior to, during, or after, transmitting the content data associated with the configurable data object. It is further appreciated that the optimization computing model comprises a logistic regression computing model.

According to some embodiments, the first parameter comprises quantitative data based on a scale. The scale, for example, can comprise a numerical quantity between 0-100. In some cases, the temporal window associated with the second parameter is at least one month, or at least two months, or at least three months, or at least four months, or at least five months, or at least six months, or at least seven months, or at least eight months, or at least nine months, or at least ten months, or at least eleven months, or at least twelve months.

In some embodiments, the first dataset or the second dataset comprises a plurality of properties associated with the collection of digital profiles. These properties, for example, can include: demographic data associated with the collection of digital profiles; biological indication data associated with the collection of digital profiles; one or more data protocols associated with managing the biological indication data associated with the collection of digital profiles; response data associated with applying the one or more data protocols to the biological indication data; or data element transition data associated with the collection of digital profiles. Furthermore, the plurality of properties associated with the collection of digital profiles can comprise observable or detectable (e.g., detectable using sensors or computing logic or other bio-electrical systems) action data associated with the collection of digital profiles. According to some embodiments, the one or more properties may be based on treatment or action protocol associated with a configurable data object; one or more active or passive motion data associated with the configurable data object or the treatment or action protocol; bio-chemical data detected in association with the collection of digital profiles; chemical data associated with the action protocol; etc. Furthermore, the one or more properties may be based on, or generated, using one or more of a Chi Square optimization computing logic, a Random Forest computing logic, or an Extreme Gradient Boosting (XGBoost) computing logic. It is appreciated that the optimization indicator comprises at least textual data and/or image data and/or video data, and/or a combination thereof.

The above-described features and applications can be implemented as software processes or data engines include specified sets of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "application" or "software" is meant to include firmware residing in read-only memory or applications stored in magnetic storage, which can be read into memory for processing by a processor. Also, in some implementations, multiple software or application technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, application, script, or code) can be written in any form of programming language, including compiled or interpreted languages, declarative or procedural languages, and it can be deployed in any form, including as a standalone program or as a sub-system, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more sub-systems, sub programs, or portions of code). A computer program can be deployed to be executed on one computer or on multiple computers that are located at one site or distributed across multiple sites and interconnected by a communication network.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

Various terms used herein have meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

It is appreciated that the term optimize/optimal and its variants (e.g., efficient or optimally) may simply indicate improving, rather than the ultimate form of 'perfection' or the like.

It is further appreciated that any portion or element of any embodiment (structure, method, etc.) disclosed herein may be combined with any portion or element of any other embodiment (structure, method, etc.) disclosed herein.

Additionally, the section headings herein are provided for consistency with the suggestions under 37 CFR 1.77 or otherwise to provide organizational cues. These headings shall not limit or characterize the disclosed embodiment(s) set out in any claims that may issue from this disclosure. Specifically, and by way of example, although the headings refer to a "Technical Field," such claims should not be limited by the language chosen under this heading to describe the so-called technical field. Further, a description of a technology in the "Background" is not to be construed as an admission that technology is prior art to any disclosed embodiment(s) in this disclosure. Neither is the "Summary" to be considered as a characterization of the disclosed embodiment(s) set forth in issued claims. Furthermore, any reference in this disclosure to "embodiment" in the singular should not be used to argue that there is only a single point of novelty in this disclosure. Multiple embodiments may be set forth according to the limitations of the multiple claims issuing from this disclosure, and such claims accordingly define the disclosed embodiment(s), and their equivalents, which are protected thereby. In all instances, the scope of such claims shall be considered on their own merits in light of this disclosure, but should not be constrained by the headings set forth herein.

The invention claimed is:

1. A method for generating an optimization indicator based on data state transitions of data elements associated with one or more digital profiles in a secure storage network, the method comprising:

initializing, using one or more computing device processors, an optimization computing model for the secure storage network, the optimization computing model being parameterized by:

a first parameter probabilistically characterizing propensity data of a collection of digital profiles associated with the secure storage network, and a second parameter associated with a temporal window within which at least some data elements comprised in the collection of digital profiles transition from a first data state to a second data state;

determining, using the one or more computing device processors, a first dataset associated with the secure storage network, the first dataset comprising a first set of data elements, associated with the collection of digital profiles, that do not transition from the first data state to the second data state;

formatting, using the one or more computing device processors, the first dataset, thereby resulting in a training dataset for application to the optimization computing model;

applying, using the one or more computing device processors, the training dataset to the optimization computing model, thereby resulting in a trained optimization computing model;

determining, using the one or more computing device processors, a second dataset associated with the secure storage network, the second dataset comprising a second set of data elements, associated with the collection of digital profiles, that transition from the first data state to the second data state within the temporal window;

applying, using the one or more computing device processors, the second dataset to the trained optimization computing model;

in response to the applying the second dataset to the trained optimization computing model, initiating, using the one or more computing device processors, display of the optimization indicator on a first graphical display device via a first application associated with the secure storage network;

determining, using the one or more computing device processors, based on the optimization indicator, a degree or rate of transition of at least one data element of the second dataset from the first data state to the second data state within the temporal window;

determining, using the one or more computing device processors, based on the degree or rate of transition of at least one data element of the second dataset from the first data state to the second data state within the temporal window, operational data associated with one or more of the collection of digital profiles;

enabling modification of, using the one or more computing device processors, the operational data, thereby resulting in modified operational data;

transmitting the modified operational data to a computing device associated with the one or more collection of digital profiles; and initiating, using the one or more computing device processors, transmission of the modified operational data to a second graphical display device via at least one of:
a second application associated with the secure storage network, or
a third application that is not associated with the secure storage network.

2. The method of claim 1, further comprising executing, using the one or more computing device processors, a computing simulation that stabilizes the optimization computing model to enable applying the second dataset to the trained optimization computing model.

3. The method of claim 1, wherein the optimization indicator is used to execute a computing operation to predict a rate of conversion of one or more digital profiles comprised in the collection of digital profiles from the first data state to the second data state.

4. The method of claim 1, wherein the optimization indicator comprises binary information associated with data elements of at least one digital profile comprised in the collection of digital profiles transitioning from the first data state to the second data state based on a configurable data object associated with the secure storage network.

5. The method of claim 4, wherein the modified operational data comprises content data associated with the configurable data object, the content data comprising data transmissions occurring after determining the optimization indicator.

6. The method of claim 5, wherein the optimization computing model is updated based on at least the optimization indicator and data element transitions of the collection of digital profiles prior to, during, or after, transmitting the content data associated with the configurable data object.

7. The method of claim 1, wherein optimization computing model comprises a logistic regression computing model.

8. The method of claim 1, wherein the first parameter comprises quantitative data based on a scale.

9. The method of claim 1, wherein the temporal window associated with the second parameter is at least three months.

10. The method of claim 1, wherein the first dataset or the second dataset comprises a plurality of properties associated with the collection of digital profiles.

11. The method of claim 10, wherein the plurality of properties associated with the collection of digital profiles comprise one or more of:
demographic data associated with the collection of digital profiles,
biological indication data associated with the collection of digital profiles,
one or more data protocols associated with managing the biological indication data associated with the collection of digital profiles,
response data associated with applying the one or more data protocols to the biological indication data, or
data element transition data associated with the collection of digital profiles.

12. The method of claim 10, wherein the plurality of properties associated with the collection of digital profiles comprise observable action data associated with the collection of digital profiles.

13. The method of claim 1, wherein the optimization indicator comprises at least textual or image data.

14. A system for generating an optimization indicator based on data state transitions of data elements associated with one or more digital profiles in a secure storage network, the system comprising:
one or more hardware computing system processors; and
at least one memory storing instructions, that when executed by the one or more hardware computing system processors causes the one or more hardware computing system processors to:
initialize an optimization computing model for the secure storage network, the optimization computing model being parameterized by:
a first parameter characterizing propensity data of a collection of digital profiles associated with the secure storage network, and
a second parameter associated with a temporal window within which at least some data elements comprised in the collection of digital profiles transition from a first data state to a second data state;
determine a first dataset associated with the secure storage network, the first dataset comprising a first set of data elements, associated with the collection of digital profiles, that do not transition from the first data state to the second data state;
format the first dataset, thereby resulting in a training dataset for application to the optimization computing model;
apply the training dataset to the optimization computing model, thereby resulting in a trained optimization computing model;
determine a second dataset associated with the secure storage network, the second dataset comprising a second set of data elements, associated with the collection of digital profiles, that transition from the first data state to the second data state within the temporal window;
apply the second dataset to the trained optimization computing model;

in response to the applying the second dataset to the trained optimization computing model, initiate display of the optimization indicator on a first graphical display device via a first application associated with the secure storage network;

determine, based on the optimization indicator, a degree or rate of transition of at least one data element of the second dataset from the first data state to the second data state within the temporal window;

determine, based on the degree or rate of transition of at least one data element of the second dataset from the first data state to the second data state within the temporal window, operational data associated with one or more of the collection of digital profiles;

enable modification of the operational data, thereby resulting in modified operational data;

transmit the modified operational data to a computing device associated with the one or more collection of digital profiles; and initiate transmission of the modified operational data to a second graphical display device via at least one of:

a second application associated with the secure storage network, or a third application that is not associated with the secure storage network.

15. The system of claim 14, wherein the one or more hardware computing system processors are further configured to execute a computing simulation that stabilizes the optimization computing model to enable applying the second dataset to the trained optimization computing model.

16. The system of claim 14, wherein the optimization indicator is used to execute a computing operation to predict a rate of conversion of one or more digital profiles comprised in the collection of digital profiles from the first data state to the second data state.

17. The system of claim 14, wherein the optimization indicator comprises binary information associated with data elements of at least one digital profile comprised in the collection of digital profiles transitioning from the first data state to the second data state based on a configurable data object associated with the secure storage network.

18. The system of claim 17, wherein the modified operational data comprises content data associated with the configurable data object, the content data comprising data transmissions occurring after determining the optimization indicator.

19. The system of claim 18, wherein the optimization computing model is updated based on at least the optimization indicator and data element transitions of the collection of digital profiles prior to, during, or after, transmitting the content data associated with the configurable data object.

20. The system of claim 14, wherein the first dataset or the second dataset comprises a plurality of properties associated with the collection of digital profiles, the plurality of properties comprising one or more of:

demographic data associated with the collection of digital profiles, biological indication data associated with the collection of digital profiles, one or more data protocols associated with managing the biological indication data associated with the collection of digital profiles, response data associated with applying the one or more data protocols to the biological indication data, or data element transition data associated with the collection of digital profiles.

\* \* \* \* \*